(12) United States Patent
Srivastava et al.

(10) Patent No.: US 10,984,320 B2
(45) Date of Patent: Apr. 20, 2021

(54) HIGHLY TRAINABLE NEURAL NETWORK CONFIGURATION

(71) Applicant: Nnaisense SA, Lugano (CH)

(72) Inventors: Rupesh Kumar Srivastava, Lugano (CH); Klaus Greff, Massagno (CH)

(73) Assignee: Nnaisense SA, Lugano (CH)

( * ) Notice: Subject to any disclaimer, the term of this patent is extended or adjusted under 35 U.S.C. 154(b) by 994 days.

(21) Appl. No.: 15/582,831

(22) Filed: May 1, 2017

(65) Prior Publication Data

US 2017/0316308 A1 Nov. 2, 2017

Related U.S. Application Data

(60) Provisional application No. 62/330,314, filed on May 2, 2016.

(51) Int. Cl.
*G06N 3/08* (2006.01)
*G06N 3/04* (2006.01)

(52) U.S. Cl.
CPC .......... *G06N 3/084* (2013.01); *G06N 3/0481* (2013.01)

(58) Field of Classification Search
None
See application file for complete search history.

(56) References Cited

U.S. PATENT DOCUMENTS

| | | |
|---|---|---|
| 5,214,715 A | 5/1993 | Carpenter et al. |
| 5,742,741 A | 4/1998 | Chiueh et al. |
| 5,864,803 A | 1/1999 | Nussbaum |
| 6,882,992 B1 | 4/2005 | Werbos |
| 7,321,882 B2 | 1/2008 | Jaeger |
| 7,395,521 B1 | 7/2008 | Linsker |
| 7,904,398 B1 * | 3/2011 | Repici .............. G06N 3/063 706/15 |
| 7,930,260 B2 | 4/2011 | Deo et al. |
| 8,103,606 B2 | 1/2012 | Moussa et al. |
| 8,311,958 B2 | 11/2012 | Nugent |
| 8,468,109 B2 | 6/2013 | Moussa et al. |
| 8,775,341 B1 | 7/2014 | Commons |
| 8,943,008 B2 | 1/2015 | Ponulak |
| 2002/0184174 A1 * | 12/2002 | Kadri .............. G06N 3/063 706/26 |
| 2015/0364127 A1 | 12/2015 | Zhao et al. |

(Continued)

OTHER PUBLICATIONS

Neelakantan, Arvind, et al. "Adding gradient noise improves learning for very deep networks." arXiv preprint arXiv:1511.06807 (2015). (Year: 2015).*

(Continued)

*Primary Examiner* — Hal Schnee
(74) *Attorney, Agent, or Firm* — Sheehan Phinney Bass & Green PA (57) ABSTRACT

A computer-based method includes receiving an input signal at a neuron in a computer-based neural network that includes a plurality of neuron layers, applying a first non-linear transform to the input signal at the neuron to produce a plain signal, and calculating a weighted sum of a first component of the input signal and the plain signal at the neuron. In a typical implementation, the first non-linear transform is a function of the first component of the input signal and at least a second component of the input signal.

28 Claims, 7 Drawing Sheets

(56) References Cited

U.S. PATENT DOCUMENTS

2015/0364128 A1 12/2015 Zhao et al.
2017/0185897 A1* 6/2017 Droppo ................ G06F 11/079

OTHER PUBLICATIONS

Kaiming He, et al; "Delving Deep into Rectifiers: Surpassing Human-Level Performance on ImageNet Classification"; Feb. 6, 2015; http://www.cv-foundation.org/openaccess/content_iccv_2015/papers/He_Delving_Deep_into_ICCV_2015_paper.pdf, downloaded May 1, 2017.

* cited by examiner

Comparison of optimization of plain networks and highway networks of various depths. All networks were optimized using SGD with momentum. The curves shown are for the best hyperparameter settings obtained for each configuration using a random search. Plain networks become much harder to optimize with increasing depth, while highway networks with up to 100 layers can still be optimized well.

FIG. 7

HIGHLY TRAINABLE NEURAL NETWORK CONFIGURATION

CROSS-REFERENCE TO RELATED APPLICATION(S)

This application claims the benefit of priority to U.S. Provisional Patent Application No. 62/330,314, entitled Highly Trainable Neural Network Configuration, which was filed on May 2, 2016. The disclosure of the prior application is incorporated by reference herein in its entirety.

FIELD OF THE INVENTION

This disclosure relates to computer-based neural networks and, more particularly, relates to computer-based neural networks configured to facilitate ease of training.

BACKGROUND

Many recent empirical breakthroughs in supervised machine learning have been achieved through the application of deep neural networks. Network depth (referring to the number of successive computation layers) has played perhaps the most important role in these successes. For instance, the top-5 image classification accuracy on the 1000-class ImageNet dataset increased from approximately 84% to approximately 95% through the use of ensembles of deeper architectures and smaller receptive fields in just a few years.

On the theoretical side, it is well known that deep networks can represent certain function classes exponentially more efficiently than shallow ones. Moreover, the use of deep networks can offer both computational and statistical efficiency for complex tasks.

However, training deeper networks is not as straightforward as simply adding layers. Optimization of deep networks has proven to be considerably more difficult, leading to research on initialization, techniques of training networks in multiple stages, or with temporary companion loss functions attached to some of the layers.

Nnaisense SA is appreciative of any collaborative support that may have been provided by La Scuola Universitaria Professionale della Svizzera Italiana (SUPSI).

SUMMARY OF THE INVENTION

In one aspect, a computer-based method includes receiving an input signal at a neuron in a computer-based neural network that comprises a plurality of neuron layers, applying a first non-linear transform to the input signal at the neuron to produce a plain signal, and calculating a weighted sum of a first component of the input signal and the plain signal at the neuron.

In another aspect, a computer-based neural network includes a plurality of layers of neurons, where each layer of neurons comprises a plurality of neurons. One or more of the neurons includes an input to receive an input signal, a means for applying a first non-linear transform to the input signal to produce a plain signal, a means for calculating a weighted sum of a first component of the input signal and the plain signal, and an output to send the calculated weighted sum out of the neuron.

In yet another aspect, a training method is disclosed that applies to a computer-based neural network. The computer-based neural network includes a plurality of layers of neurons, where each layer of neurons comprises a plurality of neurons. One or more of the neurons includes a means for applying a first non-linear transform to an input signal to produce a plain signal, a first gate configured to apply a second non-linear transform to the input signal to produce a transform signal, and a second gate configured to apply a third non-linear transform to the input signal to produce a carry signal, and a means for calculating a weighted sum of a first component of the input signal and the plain signal.

The training method includes initializing parameters associated with each of the first, second and/or third of the non-linear transforms for each of a plurality of the neurons in the computer-based neural network, analyzing an input by passing an associated input signal through the computer-based neural network in a forward direction to produce an output signal at an output of the computer-based neural network, propagating an error associated with the output signal back through the computer-based neural network, and determining whether to adjust any parameters (e.g., weights) associated with the computer-based neural network.

In still another aspect, a non-transitory, computer-readable medium is disclosed. The medium stores instructions executable by a processor to perform the steps including: receiving an input signal at a neuron in a computer-based neural network that comprises a plurality of neuron layers, applying a first non-linear transform to the input signal in the neuron to produce a plain signal and calculating a weighted sum of a first component of the input signal and the plain signal at the neuron.

In some implementations, one or more of the following advantages are present.

A novel architecture is disclosed that may enable the optimization of networks with virtually arbitrary depth. This may be accomplished, for example, through the use of a learned gating mechanism for regulating information flow. Due to this gating mechanism, a neural network can have paths along which information can flow across several layers without attenuation. These paths may be referred to as information highways, and such networks highway networks.

Preliminary experiments revealed that highway networks as deep as 900 layers can be optimized using simple Stochastic Gradient Descent (SGD) with momentum. For up to 100 layers we compared their training behavior to that of traditional networks with normalized initialization. We showed that optimization of highway networks is virtually independent of depth; while for traditional networks it suffers significantly as the number of layers increases. We also showed that certain architectures can be directly trained to obtain similar test set accuracy on the CIFAR-10 dataset without the need for a pre-trained teacher network.

Highway networks are novel neural network architectures which enable the training of extremely deep networks using simple SGD. While the traditional plain neural architectures become increasingly difficult to train with increasing network depth (even with variance-preserving initialization), our experiments show that optimization of highway networks is not hampered even as network depth increases to a hundred layers.

The ability to train extremely deep networks opens up the possibility of studying the impact of depth on complex problems without restrictions. Various activation functions that may be more suitable for particular problems, but for which robust initialization schemes are unavailable can be used in deep highway networks. Future work will also attempt to improve the understanding of learning in highway networks.

Other features and advantages will be apparent from the description and drawings, and from the claims.

BRIEF DESCRIPTION OF THE DRAWINGS

Like reference characters refer to like elements.

DETAILED DESCRIPTION

Figure 1:
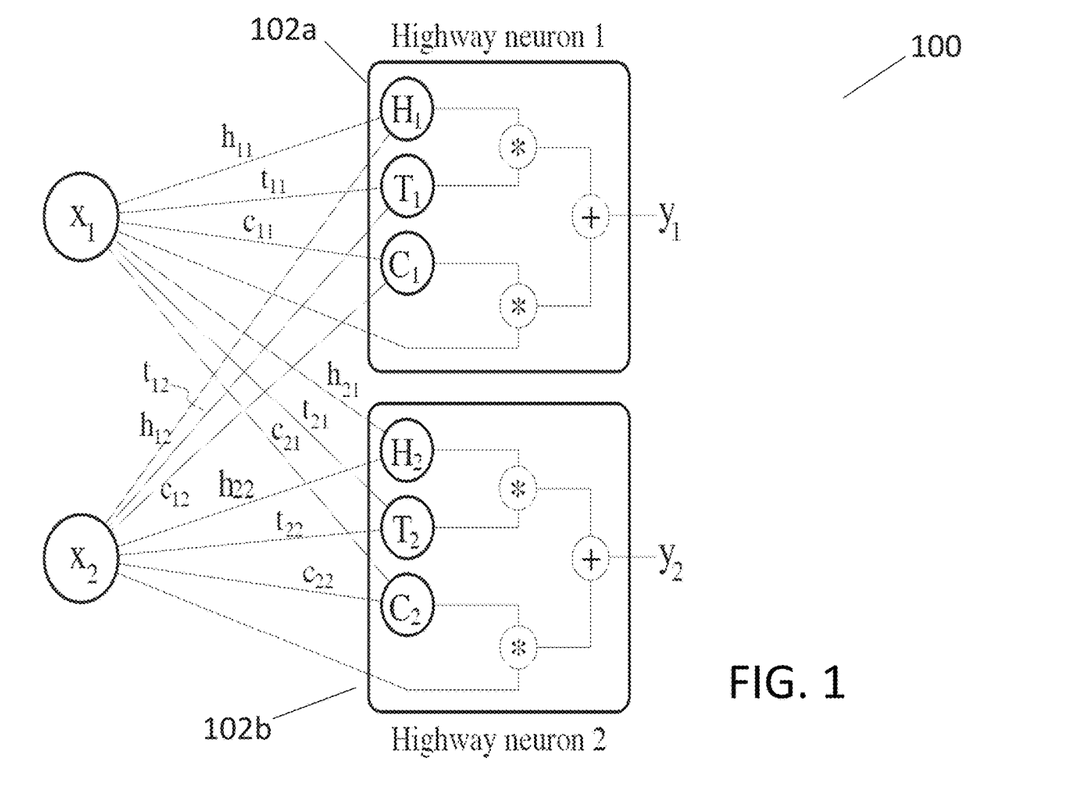
FIG. 1 is a schematic representation showing a portion of an exemplary computer-based neural network.

FIG. 1 is a schematic representation showing a portion of an exemplary computer-based neural network 100.

The portion of the network 100 shown in the illustrated example has two highway neurons 102a, 102b (also referred to herein as simply "neurons"), each of which is configured to receive and act upon an input signal that includes two components ($x_1$ and $x_2$). Highway neuron 102a produces output signal $y_1$ and highway neuron 102b produces output signal $y_2$. In a typical implementation, the illustrated highway neurons 102a, 102b would be part of a larger computer-based neural network 100 that includes multiple processing layers of interconnected neurons. Typically, the illustrated neurons 102a, 102b would form at least part of one processing layer in the network, input signal ($x_1$, $x_2$) might originate as an output of other neurons (e.g., in an upstream processing layer of the neural network), and each output signal ($y_1$, $y_2$) might be sent to a plurality of other neurons (e.g., in a downstream layer of the neural network) or to an output of the overall neural network 100.

In an alternative implementation, the illustrated neurons 102a, 102b may represent substantially an entire neural network. In those implementations, the input signal ($x_1$, $x_2$) would represent an input to the entire neural network and the outputs ($y_1$, $y_2$) would represent an output from the entire neural network.

Generally speaking, computer-based neural networks, like the one represented in FIG. 1, are configured to simulate the behavior of biological neural networks and may be able to perform various functions, such as pattern recognition, language processing, and problem solving, with the goal of self-directed information processing. The particular configuration of the neurons and network represented in the illustrated example facilitates training, particularly in very deep (e.g., 20 or more layers) computer-based neural network configurations, where training has traditionally proven to be very difficult and increasingly so as the number of processing layers in the network increases. This relative ease of training, in turn, makes it relatively easy to create and deploy to a useful purpose very deep neural networks, far deeper than previously practicable. The configurations of the two neurons 102a, 102b shown in the illustrated embodiment are similar. In this regard, each neuron includes an input (not labeled) to receive an input signal ($x_1$, $x_2$), a means ($H_1$, $H_2$) for applying a first non-linear transform to the input signal to produce a plain signal, a first gate ($T_1$, $T_2$) configured to apply a second non-linear transform to the input signal to produce a transform signal, and a second gate ($C_1$, $C_2$) configured to apply a third non-linear transform to the input signal to produce a carry signal.

Each neuron 102a, 102b also has a means for calculating a weighted sum of an associated component (e.g., either $x_1$ or $x_2$) of the input signal and a corresponding plain signal. In this regard, each neuron 102a, 102b includes at least one multiplier module (designated with a symbol) configured to: a) calculate a product of the plain signal and the transform signal to produce a weighted plain signal, and b) calculate a product of a first component of the input signal (e.g., $x_1$ or $x_2$) and the carry signal to produce a weighted input signal component. Moreover, in this regard, each neuron 102a, 102b includes an adder module (designated with a + symbol) configured to add the weighted plain signal to the weighted input signal component to produce the weighted sum ($y_1$, $y_2$).

Finally, each neuron typically has an output (not shown) to output an output signal that includes the calculated weighted sum ($y_1$, $y_2$). In a typical implementation, the output signal from a single neuron (e.g., 102a or 102b) may be provided to one or more (or all of the) neurons in a subsequent (or "downstream") processing layer of the computer-based neural network 100.

The input signal ($x_1$, $x_2$) has two components $x_1$ and $x_2$. Each component gets weighted by a plurality of associated weights. In particular, component $x_1$ gets weighted by $h_{11}$, $t_{11}$, and $c_{11}$ for the first neuron 102a, and gets weighted by weights $h_{21}$, $t_{21}$, and $c_{21}$ for the second neuron 102b. Likewise, component $x_2$ gets weighted by weights $h_{12}$, $t_{12}$, and $c_{12}$ for the first neuron, and gets weighted by weights $h_{22}$, $t_{22}$ and $c_{22}$ for the second neuron. In a typical implementation, the weights are utilized by the neurons to perform the associated transforms.

In a typical implementation, at any point in time, each respective weight may have any value. For example, at a particular point in time, h11 may be 1, t11 may be −0.5, c11 may be 2.75, h21 may be 0, t21 may be 0.2, c21 may be −0.2, h12 may be −3, t12 may be 1, c12 may be 0.9, h22 may be −0.33, t22 may be 5 and c22 may be −10. Some of the weights may be fixed (e.g., programmed to a specific value and unchanging over some particular period of time) and/or some (or all) of the weights may be learned (e.g., changeable over time). Fixed values of the weights may be used to in turn fix the outputs of any of the non-linear transformations (H1, H2, T1, T2, C1, C2) to some specific value, typically 0 or 1. The value assigned to each weight at any particular point in time, can be virtually any value. However, generally speaking, all the weights associated with the second gate (C1, C2) are not fixed at a value of zero at the same time.

In a typical implementation, each neuron includes or has access to software stored in a computer-based memory device and hardware (e.g., a computer-based processing device) to implement various functionalities associated with that software. Thus, in some exemplary implementations, each neuron would include or have access to a computer-based processing device that implements software to act as the means (H1, H2) for applying the first non-linear transform, the first gate (T1 T2), and the second gate (C1, C2). Moreover, in some of those exemplary implementations, the computer-based processing device of each neuron might implement the software to act as the multiplier module and/or the adder module as well.

Considering each neuron individually now, neuron 102a has an input (not labeled) configured receive input signal ($x_1$, $x_2$), a means ($H_1$) for applying a first non-linear transform to the input signal ($x_1$, $x_2$) to produce a plain signal, a first gate ($T_1$) configured to apply a second non-linear transform to the input signal ($x_1$, $x_2$) to produce a transform signal, and a second gate ($C_1$) configured to apply a third non-linear transform to the input signals ($x_1$, $x_2$) to produce a carry signal. In a typical implementation, each non-linear transform ($H_1$), ($T_1$) and ($C_1$) is a function of both components of the input signal ($x_1$ and $x_2$) and associated weights. Neuron 102a also has a means for calculating a weighted sum ($y_1$) of a first component ($x_1$) of the input signal and the plain signal (in the illustrated example, the means for calculating the weighted sum includes the multiplier modules (designated with a * symbol) and an adder module (designated with a + symbol)). Neuron 102a also has an output (not shown) for outputting the weighted sum ($y_1$).

Likewise, neuron 102b includes has an input (not labeled) configured to receive input signal ($x_1$, $x_2$), a means ($H_2$) for applying a first non-linear transform to the input signal ($x_2$) to produce a plain signal, a first gate ($T_2$) configured to apply a second non-linear transform to the input signal ($x_2$) to produce a transform signal, and a second gate ($C_2$) configured to apply a third non-linear transform to the input signals ($x_2$) to produce a carry signal. In a typical implementation, each non-linear transform ($H_2$), ($T_2$) and ($C_2$) is a function of both input signals ($x_1$, $x_2$) and associated parameters. Neuron 102b also has a means for calculating a weighted sum ($y_2$) of a second component of the input signal and the plain signal (in the illustrated example, the means for calculating the weighted sum includes the multiplier modules (designated with a symbol) and an adder module (designated with a + symbol)). Neuron 102b also has an output (not shown) for outputting the weighted sum ($y_2$).

In each neuron, the transform signal (output of T) and the carry signal (output of C) determine how the plain signal and an associated component of the input signals are respectively weighted in calculating the weighted sum ($y_1$, $y_2$) of the associated component of the input signal and the plain signal at the neuron. In some exemplary implementations, the transform signal and the carry signal each have a value from zero to one, and the two values together add up to one. In those exemplary implementations, in neuron 102a, if the carry signal were one and the transform signal were zero, then the corresponding component of the input signal would be carried through, virtually unchanged, to the output (as $y_1$) of the neuron 102a. If, however, the transform signal were one and the carry signal were zero, then the output signal ($y_1$) of the neuron 102a would be a transformed version (transformed by $H_1$) of the corresponding input signal ($x_1$, $x_2$). If the transform signal and the carry signal had values somewhere between zero and one (e.g., the transform signal had a value of 0.7 and the carry signal had a value of 0.3), then the output signal ($y_1$) from neuron 102a would be a mix of essentially 30% of the corresponding component of the input signal and 70% of the transformed version of the corresponding input signal.

Thus, depending on the value of the transform signal (output of T) and the carry signal (output of C), a particular neuron may essentially: 1) pass a copy of a corresponding component of the input signal (e.g., $x_1$) to its output; 2) pass a transformed (e.g., by $H_1$) version of the input signal ($x_1$, $x_2$) to its output; or 3) pass some mix of the corresponding component of the input signal (e.g., $x_1$ or $x_2$) and a transformed (e.g., by $H_1$) version of the input signal ($x_1$, $x_2$) to its output.

In a typical implementation, numerous signals would propagate through the network 100 in a forward direction (e.g., left to right in FIG. 1) from an input of the network 100, where signals are created that correspond to an object (e.g., a picture, sound, etc.) to be analyzed, to an output of the network 100 (as an output signal), passing through, typically numerous processing layers that include numerous interconnected neurons along the way. Generally speaking, in a typical implementation, the input to the computer-based neural network represents an object at a single point in time—so, not a time varying signal (e.g., voice over time). However, the techniques and networks disclosed herein can be adapted to be included with other techniques and/or networks to analyze time-varying signals as well.

Figure 2:
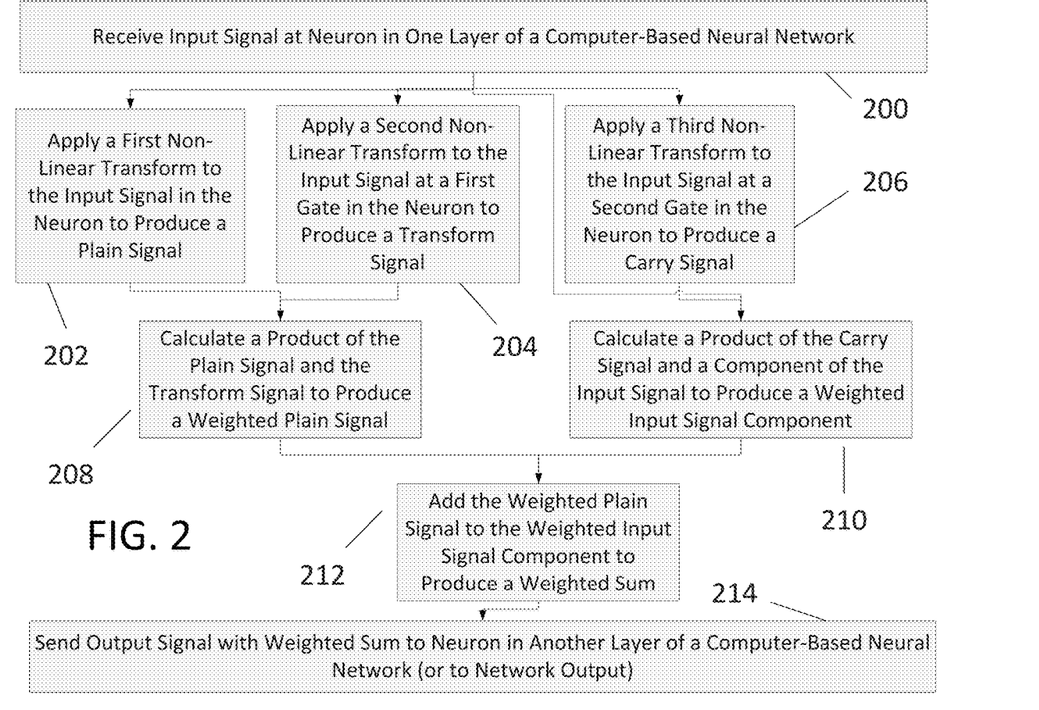
FIG. 2 is a flowchart showing an exemplary process that may be performed by a single neuron in the exemplary computer-based neural network of FIG. 1.

FIG. 2 is a flowchart showing an exemplary process performed by a single neuron (e.g., neuron 102a in FIG. 1).

According to the illustrated flowchart, the neuron (at 200) receives an input signal (e.g., from a previous (or "upstream") network location).

Next, the neuron (at 202) applies a first non-linear transform to the input signal to produce a plain signal, (at 204) applies a second non-linear transform to the input signal at a first gate in the neuron to produce a transform signal, and (at 206) applies a third non-linear transform to the input signal at a second gate in the neuron to produce a carry signal.

Next, the neuron calculates a weighted sum of a first component of the input signals and the plain signal. According to the illustrated example, this includes calculating (at 208) a product of the plain signal and the transform signal to produce a weighted plain signal, calculating (at 210) a product of the first component of the input signals and the carry signal to produce a weighted input signal component, and adding (at 212) the weighted plain signal to the weighted input signal component to produce the weighted sum.

Finally, (at 214) the weighted sum is output as part of an output signal to one or more other neurons in a second layer of the computer-based neural network.

Figure 3:
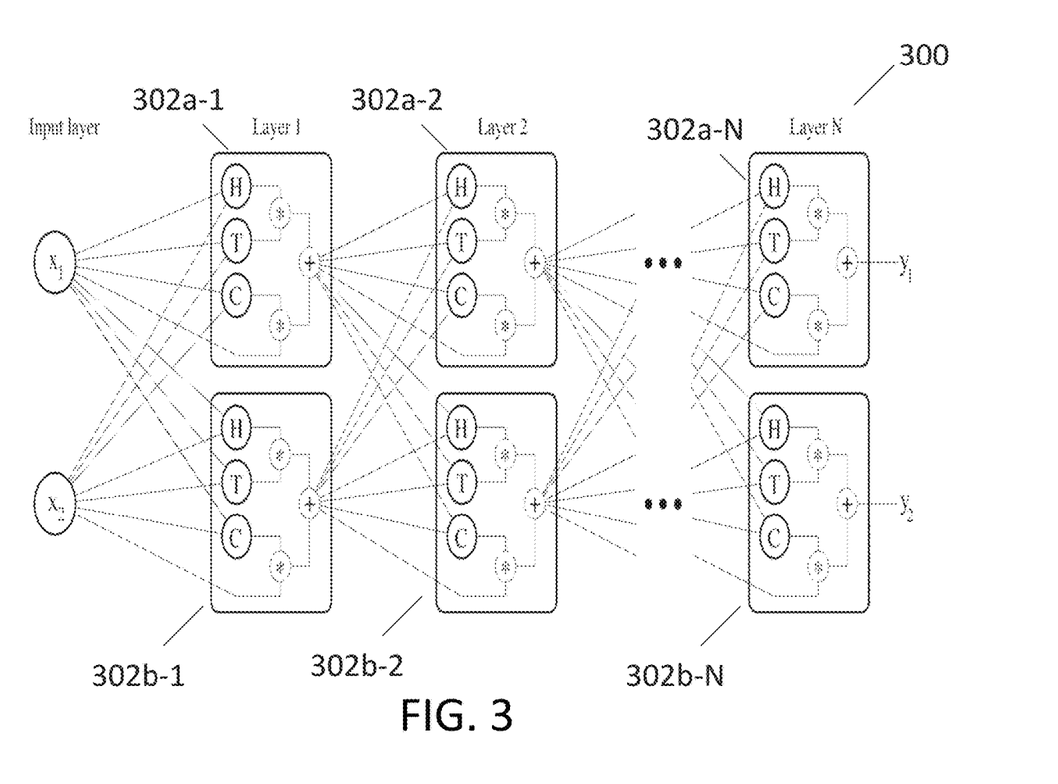
FIG. 3 is a schematic representation showing a portion of another exemplary computer-based neural network.

FIG. 3 is a schematic representation showing a portion of an exemplary computer-based neural network 300.

According to the illustrated representation, the exemplary computer-based neural network includes an input layer (that provides an input signal $x_1$ and $x_2$) and multiple processing layers (e.g., Layer 1, Layer 2, . . . , Layer N) that lead to a pair of outputs $y_1$ and $y_2$. Although the illustrated example only shows an input signal with two components ($x_1$, $x_2$), two neurons per processing layer, and two outputs ($y_1$, $y_2$), in a typical implementation, a computer-based neural network, such as the one partially shown in FIG. 3, might include numerous input components, layers, neurons per layer and outputs. Of course, the network represented in FIG. 3 already allows for an arbitrary number of layers by virtue of N in the figure.

Every neuron 302a-1, 302a-2, 302b-1, 302b-2, 302c-1 and 302c2 in the illustrated example has a configuration that is similar to the neurons 102a and 102b in FIG. 1, discussed above. Of course, that need not be the case. In some exemplary implementations, some of the neurons in a particular neural network may have different configurations, including a simpler, more traditional configuration including, for example, one configured to perform only a single non-linear transformation.

According to the illustrated implementation, the input layer provides an input signal ($x_1$, $x_2$) to the neurons 302a-1 and 302b-1 in processing Layer 1 of the illustrated network 300. Each of these neurons 302a-1 and 302b-1 in processing Layer 1 processes the corresponding input signal ($x_1$, $x_2$) to produce an output signal. Each output signal from one of the neurons 302a-1 or 302b-1 is then passed along as an input signal to each of the two neurons 302a-2 and 302b-2 in the subsequent ("downstream") processing Layer 2.

Each of the neurons 302a-2 and 302b-2 in processing Layer 2 processes the input signal it receives from the Layer 1 neurons 302a-1 and 302b-1 to produce an output signal. Each of those output signals (from one of the neurons 302a-2 or 302b-2) is then passed along as an input signal to each of the neurons in a subsequent ("downstream") processing Layer.

Finally, each the neurons 302a-N and 302b-N in the last processing Layer N processes its input signal (i.e. the output signal of Layer N-1) to produce an output signal ($y_1$ or $y_2$), which represent outputs of the overall network 300.

Figure 4:
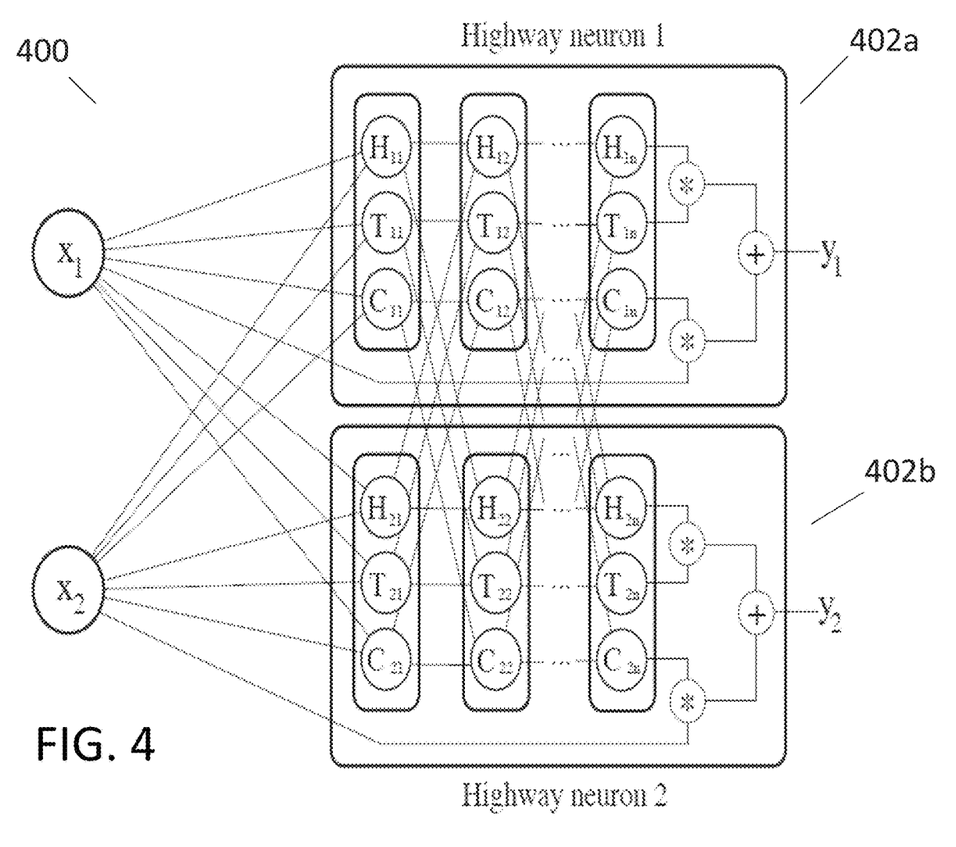
FIG. 4 is a schematic representation showing a portion of yet another exemplary computer-based neural network.

FIG. 4 is a schematic representation showing a portion of yet another exemplary computer-based neural network 400.

The computer-based neural network 400 in FIG. 4 is similar in some ways to the computer-based neural network 100 in FIG. 1. However, in the computer-based neural network 400 in FIG. 4, each transform (e.g., H, T and C) performed by each neuron 402a, 402b consists of a sequence of transforms.

So, for example, the transform that leads to the plain signal in the first neuron 402a of FIG. 4 includes a series of transforms $H_{11}$, $H_{12}$ through $H_{1N}$. Transform $H_{11}$ is a function of the input signal ($x_1$, $x_2$). Transform $H_{12}$ is a function of the output from transform $H_{11}$ in the first neuron 402a and the output of a corresponding transform $H_{21}$ from a second neuron 402b. Finally, transform $H_{1N}$ is a function of the output from an immediately preceding (or upstream) $H_{1(N-1)}$ transform in an immediately preceding neuron and the output of a corresponding $H_{2(N-1)}$ transform from the immediately preceding neuron.

Likewise, the transform that leads to the transform signal in the first neuron 402a of FIG. 4 includes a series of transforms $T_{11}$, $T_{12}$ through $T_{1N}$. Transform $T_{11}$ is a function of the input signal ($x_1$, $x_2$). Transform $T_{12}$ is a function of the output from transform $T_{11}$ in the first neuron 402a and the output of a corresponding transform $T_{21}$ from a second neuron 402b. Finally, transform $T_{1N}$ is a function of the output from an immediately preceding (or upstream) $T_{1(N-1)}$ transform in an immediately preceding neuron and the output of a corresponding $T_{2(N-1)}$ transform from the immediately preceding neuron.

Similarly, the transform that leads to the carry signal in the first neuron 402a of FIG. 4 includes a series of transforms $C_{11}$, $C_{12}$ through $C_{1N}$. Transform $C_{11}$ is a function of the input signal ($x_1$, $x_2$). Transform $C_{12}$ is a function of the output from transform $C_{11}$ in the first neuron 402a and the output of a corresponding transform $C_{21}$ from a second neuron 402b. Finally, transform $C_{1N}$ is a function of the output from an immediately preceding (or upstream) $C_{1(N-1)}$ transform in the immediately preceding neuron and the output of a corresponding $C_{2(N-1)}$ transform from the immediately preceding neuron.

Second neuron 402b in network 400 is configured in a similar manner as first neuron 402a.

So, for example, the transform that leads to the plain signal in the second neuron 402b of FIG. 4 includes a series of transforms $H_{21}$, $H_{22}$ and $H_{2N}$. Transform $H_{21}$ is a function of the input signal ($x_1$, $x_2$). Transform $H_{22}$ is a function of the output from transform $H_{21}$ in the second neuron 402b and the output of a corresponding transform $H_{11}$ from the first neuron 402a. Finally, transform $H_{2N}$ is a function of the output from the immediately preceding (or upstream) $H_{1(N-1)}$ transform from the first neuron 402a and the output of a corresponding $H_{2(N-1)}$ transform in the second neuron 402b.

Likewise, the transform that leads to the transform signal in the second neuron 402b of FIG. 4 includes a series of transforms $T_{21}$, $T_{22}$ through $T_{2N}$. Transform $T_{21}$ is a function of the input signal ($x_1$ and $x_2$). Transform $T_{22}$ is a function of the output from transform $T_{21}$ in the second neuron 402b and the output of a corresponding transform $T_{11}$ from the first neuron 402a. Finally, transform $T_{2N}$ is a function of the output from the immediately preceding (or upstream) $T_{1(N-1)}$ transform from the first neuron 402a and the output of a corresponding $T_{2(N-1)}$ transform in the second neuron 402b.

Similarly, the transform that leads to the carry signal in the second neuron 402b of FIG. 4 includes a series of transforms $C_{21}$, $C_{22}$ through $C_{2N}$. Transform $C_{21}$ is a function of the input signal ($x_1$, $x_2$). Transform $C_{22}$ is a function of the output from transform $C_{21}$ in the second neuron 402a and the output of a corresponding transform $C_{11}$ from the first neuron 402a. Finally, transform $C_{2N}$ is a function of the output from the immediately preceding (or upstream) $C_{1(N-1)}$ transform from the first neuron 402a and the output of a corresponding $C_{2(N-1)}$ transform from in the second neuron 402b.

According to the illustrated implementation, in neuron 402a, for example, the plain signal (i.e., the output of transform $H_{11}$, $H_{12}$, . . . , $H_{1N}$) is multiplied by the transform signal (i.e., the output of transform $T_{11}$, $T_{12}$, . . . , $T_{1N}$) to produce a weighted transform signal, and one component ($x_1$) of the input signal is multiplied by the carry signal (i.e., the output of transform $C_{11}$, $C_{12}$, . . . , $C_{1N}$) to produce a weighted input signal component. The weighted input signal component and the weighted transform signal are then added together to produce the weighted sum ($y_1$).

Similarly, according to the illustrated implementation, in neuron 402b, for example, the plain signal (i.e., the output of transform $H_{21}$, $H_{22}$, . . . , $H_{2N}$) is multiplied by the transform signal (i.e., the output of transform $T_{21}$, $T_{22}$, . . . , $T_{2N}$) to produce a weighted transform signal, and one component ($x_2$) of the input signal is multiplied by the carry signal (i.e., the output of transform $C_{21}$, $C_{22}$, . . . , $C_{2N}$) to produce a weighted input signal component. The weighted input signal component and the weighted transform signal are then added together to produce the weighted sum ($y_1$).

In a typical implementation, as mentioned above, the architectures disclosed herein lead to computer-based neural networks that are relatively easy to train, particularly if the networks are very deep networks. Thus, the computer-based neural network is configured to learn (or be taught) and, generally speaking, this learning leads to a reduction in error associated with a network output. In a typical implementation, the learning process may involve adjusting one or more parameters (e.g., weights) associated with one or more of the first, second or third non-linear transforms at one or more of the neurons in a given network.

Generally speaking, adjusting the parameters (e.g., weights) associated with the second or third non-linear transforms may influence weighting associated with the plain signal and the input signal, respectively, to calculate the weighted sum (that becomes or is included with an output signal from a neuron).

Figure 5:
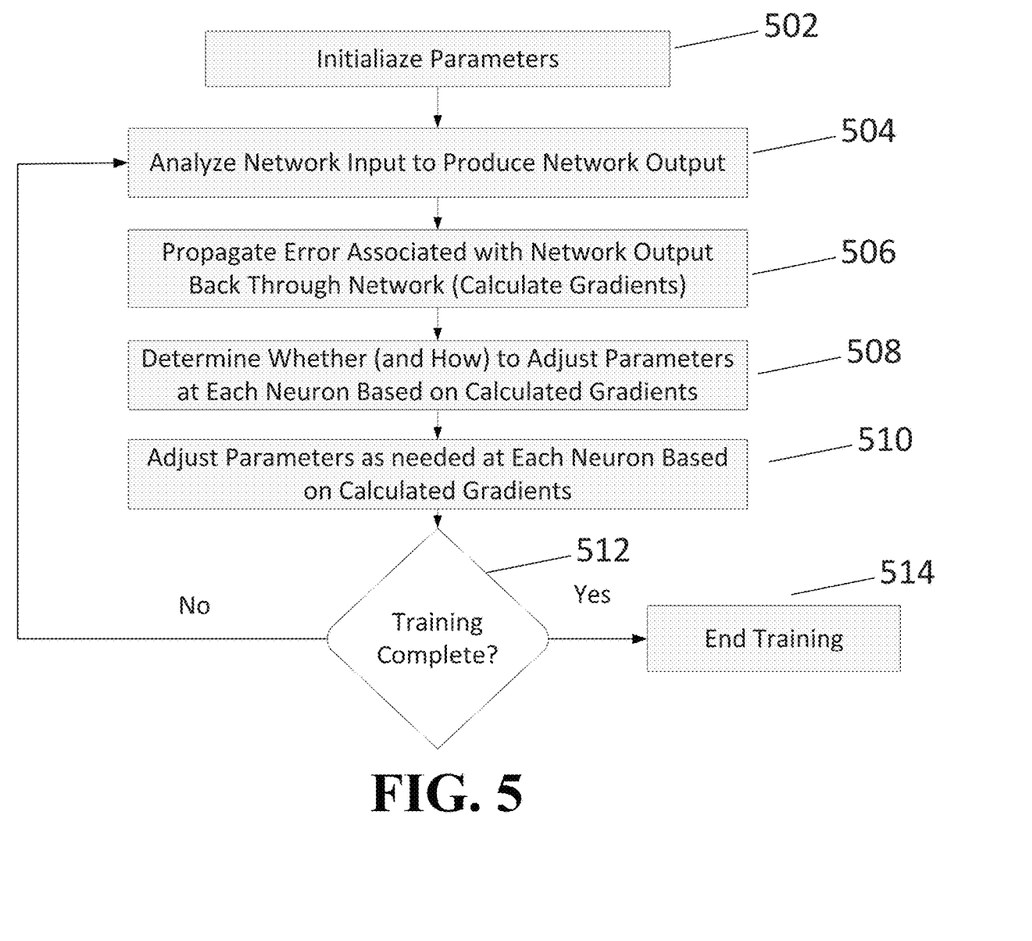
FIG. 5 is a flowchart that represents one exemplary method for training an exemplary computer-based neural network, such as the ones disclosed herein.

FIG. 5 is a flowchart that represents one exemplary method for training an exemplary computer-based neural network, such as the ones disclosed herein.

According to the illustrated flowchart, the method includes (at 502) initializing the various parameters (e.g., for the transforms at one or more of the neurons in the network). In some implementations, it may be beneficial to select the initial parameters so as to bias some (or all) of the neurons to pass (or carry) the input to the output without being transformed, or without being significantly transformed. In some implementations, introducing this sort of bias at initialization may make the training easier.

Next, according to the illustrated flowchart, the method includes (at 504) analyzing a network input (e.g., a signal that represent some object, such as an image to be analyzed). In a typical implementation, analyzing the network input would involve propagating the signal through the computer-based neural network in a forward direction (e.g., from left to right in FIGS. 1, 3 and 4) to an output of the neural network.

In a typical implementation, during training the resulting output signal is then compared to a target signal indicating the correct output of the network. So, if the network is being used to classify images of cats and dogs, for example, the output and target signals would have two components, one for cats and one for dogs. When the network is analyzing the image of a dog, the target signal would, for example, have a value of 1.0 for the dog component and a value of 0.0 for the cat component. Likewise, if the network is analyzing the image of a cat, the target signal would, for example, have a value of 1.0 for the cat component and a value of 0.0 for the dog component. The resulting output signal components would then be compared to the corresponding target signal components and an error can be established between the actual resulting output signal and the target signal. One way to calculate error in this regard is to simply subtract one signal from the other.

Next, according to the illustrated example, the method involves (at 506) propagating the error back through the network and calculating gradients along the way to determine (at 508) whether (and how) to adjust any parameters (e.g., weights) at each neuron based on the calculated gradients. Next, according to the illustrated example, the method involves (at 510) adjusting parameters (e.g., weights) as needed at each respective one or more of the neurons as deemed appropriate. The aim of any adjustments being made is to improve the networks ability to accurately function.

Typically, training is an iterative process that returns to 504 (after 510) to analyze a new input. Generally speaking, the more iterations of training that occur, the better functioning the resulting computer-based neural network will become. If (at 512) the training is deemed complete, then the training ends (at 514).

Generally speaking, training can be difficult in traditional deep neural networks. This is because many deep neural networks require non-linear transforms to take place at every neuron in the network. Back propagating errors though those kinds of deep neural networks may cause an exponential decay of the error signal as it moves back through the various layers of the network so that when the back propagation reaches the first layers (closest to the input layers) of the network, the back propagated signal is too small to be of much value. In a typical implementation of the current disclosure, some of the neurons do not require a non-linear transform to occur (e.g., where the carry signal is one and the transform signal is zero). Thus, on a whole, the first layers (e.g., closest to the input layer) of a neural network implementing the techniques disclosed herein would see a relatively large impact of a back propagated error, particularly at the early layers of a very deep neural network.

Figure 6:
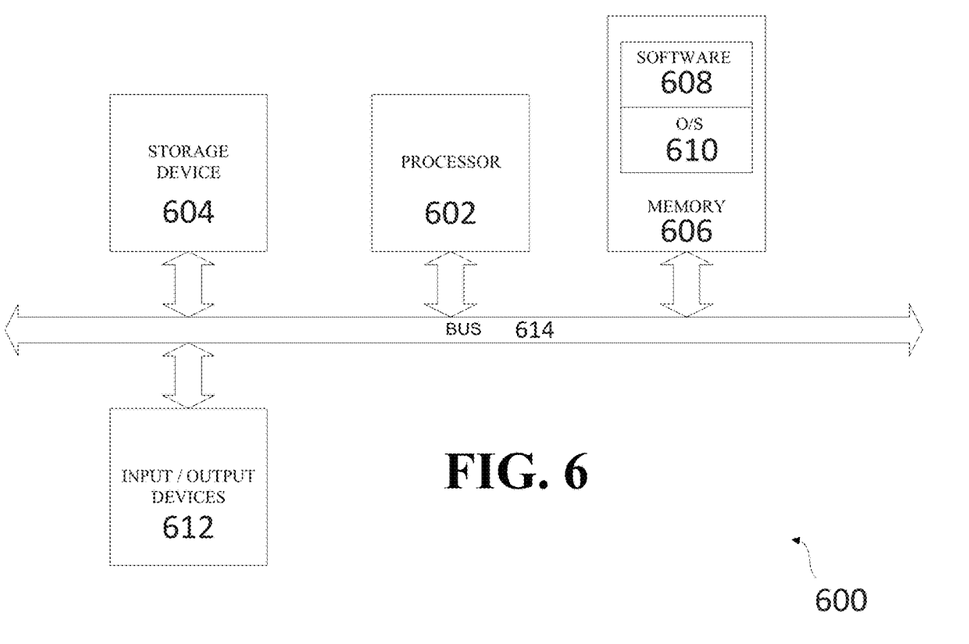
FIG. 6 is a schematic representation of an exemplary computer system 600 with which or upon which some or all of the techniques and networks disclosed herein may be implemented.

FIG. 6 is a schematic representation of an exemplary computer system 600 with which or upon which some or all of the techniques and networks disclosed herein may be implemented.

The illustrated computer system 600 has a computer-based processor 602, a computer-based storage device 604, a computer-based memory 606 with software 608 and an operating system 610 stored therein that, when executed by the processor 602, causes the processor to provide functionality to support and facilitate system operations as described herein, input and output (I/O) devices 612 (or peripherals), and a local bus (or interface 614) that allows for internal communications among the illustrated components.

The local interface 614 can be, for example, one or more buses or other wired or wireless connections. In various implementations, the computer system 600 may have additional elements, such as controllers, buffers (caches), drivers, repeaters, and receivers, to facilitate communications and other functionalities. Further, the local interface 614 may include address, control, and/or data connections to enable appropriate communications among the illustrated components.

The processor 602, in the illustrated example, may be a hardware device for executing software, particularly that stored in the memory 606. The processor 602 can be, for example, a custom made or commercially available single core or multi-core processor, a central processing unit (CPU), an auxiliary processor among several processors associated with the present computer system, a semiconductor based microprocessor (e.g., in the form of a microchip or chip set), a macroprocessor, or generally any device for executing software instructions. In addition, the processing function can reside in a cloud-based service accessed over the Internet. The memory 606 can include any one or combination of volatile memory elements (e.g., random access memory (RAM, such as DRAM, SRAM, SDRAM, etc.)) and/or nonvolatile memory elements (e.g., ROM, hard drive, tape, CDROM, etc.). Moreover, the memory 606 may incorporate electronic, magnetic, optical, and/or other types of storage media. The memory 606 can have a distributed architecture, with various memory components being situated remotely from one another, but accessible by the processor 602.

The software 608 may include one or more computer programs, each of which contains an ordered listing of executable instructions for implementing logical functions associated with the computer system 600, as described herein. The memory 606 may contain the operating system (O/S) 610 that controls the execution of one or more programs within the computer system 600, including scheduling, input-output control, file and data management, memory management, communication control and related services and functionality.

The I/O devices 612 may include one or more of any type of input or output device. Examples include a keyboard, mouse, scanner, microphone, printer, display, etc. In some implementations, a person having administrative privileges, for example, may access the computer-based processing device to perform administrative functions through one or more of the I/O devices 612.

In a typical implementation, the computer system 600 also includes a network interface that facilitates communication with one or more external components via a communications network. The network interface can be virtually any kind of computer-based interface device. In some instances, for example, the network interface may include one or more modulator/demodulators (i.e., modems) for accessing another device, system, or network, a radio frequency (RF) or other transceiver, a telephonic interface, a bridge, router, or other device. During system operation, the computer system 600 may receive data and send notifications and other data via such a network interface.

Here we present a further discussion of some of the concepts mentioned elsewhere. Boldface letters are used for vectors and matrices, and italicized capital letters to denote transformation functions. 0 and 1 denote vectors of zeros and ones respectively, and $\mathbb{I}$ denotes an identity matrix. The function $\sigma(x)$ is defined as:

$$\sigma(x) = \frac{1}{1+e^{-x}}, \quad x \in \mathbb{R}.$$

Highway Networks

A plain feedforward neural network typically consists of L layers where the l-th layer ($l \in \{1, 2, \ldots, L\}$) applies a nonlinear transform H (parameterized by $W_{H,l}$) on its input $x_l$ to produce its output $y_l$. Thus, $x_1$ is the input to the network and $y_L$ is the network's output. Omitting the layer index and biases for clarity, $$y = H(x, W_H). \quad (1)$$

H is usually an affine transform followed by a non-linear activation function, but in general it may take other forms.

For a highway network, we additionally define two non-linear transforms $T(x, W_T)$ and $C(x, W_C)$ such that $$y = H(x, W_H) \cdot T(x, W_T) + x \cdot C(x, W_C), \quad (2)$$

where · denotes element-wise multiplication.

We refer to T as the transform gate and C as the carry gate, since they express how much of the output is produced by transforming the input and carrying it, respectively. For simplicity, in this description we set C=1−T, giving $$y = H(x, W_H) \cdot T(x, W_T) + x \cdot (1 - T(x, W_T)). \quad (3)$$

Generally speaking, the dimensionality of x, y, $H(x, W_H)$ and $T(x, W_T)$ must be the same for Equation (3) to be valid. Note that this re-parametrization of the layer transformation is generally much more flexible than Equation (1). In particular, observe that $$y = \begin{cases} x, & \text{if } T(x, W_T) = 0, \\ H(x, W_H), & \text{if } T(x, W_T) = 1. \end{cases} \quad (4)$$

Similarly, for the Jacobian of the layer transform, $$\frac{dy}{dx} = \begin{cases} \mathbb{I}, & \text{if } T(x, W_T) = 0, \\ H'(x, W_H), & \text{if } T(x, W_T) = 1. \end{cases} \quad (5)$$

Thus, depending on the output of the transform gates, a highway layer can smoothly vary its behavior between that of a plain layer and that of a layer which simply passes its inputs through. Just as a plain layer consists of multiple computing units such that the i-th unit computes $y_i = H_i(x)$, a highway network consists of multiple blocks such that the i-th block computes a block state $H_i(x)$ and transform gate output $T_i(x)$. Finally, it produces the block output $y_i = H_i(x) \cdot T_i(x) + x_i \cdot (1 - T_i(x))$, which is connected to the next layer.

Constructing Highway Networks

As mentioned earlier, Equation (3) generally requires that the dimensionality of x, y, $H(x, W_H)$ and $T(x, W_T)$ be the same. In cases when it is desirable to change the size of the representation, one can replace x with $\hat{x}$ obtained by suitably sub-sampling or zero-padding x. Another alternative is to use a plain layer (without highways) to change dimensionality and then continue with stacking highway layers.

Convolutional highway layers are constructed similar to fully connected layers. Weight-sharing and local receptive fields are utilized for both H and T transforms. We use zero-padding to ensure that the block state and transform gate feature maps are the same size as the input.

Training Deep Highway Networks

For plain deep networks, training with SGD stalls at the beginning unless a specific weight initialization scheme is used such that the variance of the signals during forward and backward propagation is preserved initially. This initialization depends on the exact functional form of H.

For highway layers, we use the transform gate defined as:

$$T(x) = \sigma(W_T x + b_T),$$

where $W_T$ is the weight matrix and $b_T$ the bias vector for the transform gates. This suggests a simple initialization scheme which is independent of the nature of H: $b_T$ can be initialized with a negative value (e.g. −1, −3 etc.) such that the network is initially biased towards carry behavior. Note that $$\sigma(x) \in (0,1), \forall x \in \mathbb{R},$$

so the conditions in Equation (4) can generally never be exactly true.

In our experiments, we found that a negative bias initialization was sufficient for learning to proceed in very deep networks for various zero-mean initial distributions of $W_T$ and different activation functions used by H. This is significant property since in general it may not be possible to find effective initialization schemes for many choices of H.

Optimization Experiment

Very deep plain networks become difficult to optimize even if using the variance-preserving initialization scheme. To show that highway networks do not suffer from depth in the same way we ran a series of experiments on the MNIST digit classification dataset. We measured the cross entropy error on the training set, in order to investigate optimization, without conflating with generalization issues.

We trained both plain networks and highway networks with the same architecture and varying depth. The first layer was always a plain fully-connected layer followed by 9, 19, 49, or 99 fully-connected plain or highway layers and a single softmax output layer. The number of units in each layer was kept constant and it is 50 for highways and 71 for plain networks. That way the number of parameters is roughly the same for both. To make the comparison fair, we run a random search of 40 runs for both plain and highway networks to find good settings for the hyperparameters. We optimized the initial learning rate, momentum, learning rate decay rate, activation function for H (either ReLU or tan h) and, for highway networks, the value for the transform gate bias (between −1 and −10). All other weights were initialized following a scheme introduced in He, Kaiming, Zhang, Xiangyu, Ren, Shaoqing, and Sun, Jian. Delving deep into rectifiers: Surpassing human-level performance on ImageNet classification. arXiv: 1502.01852[cs], February 2015.

Figure 7:
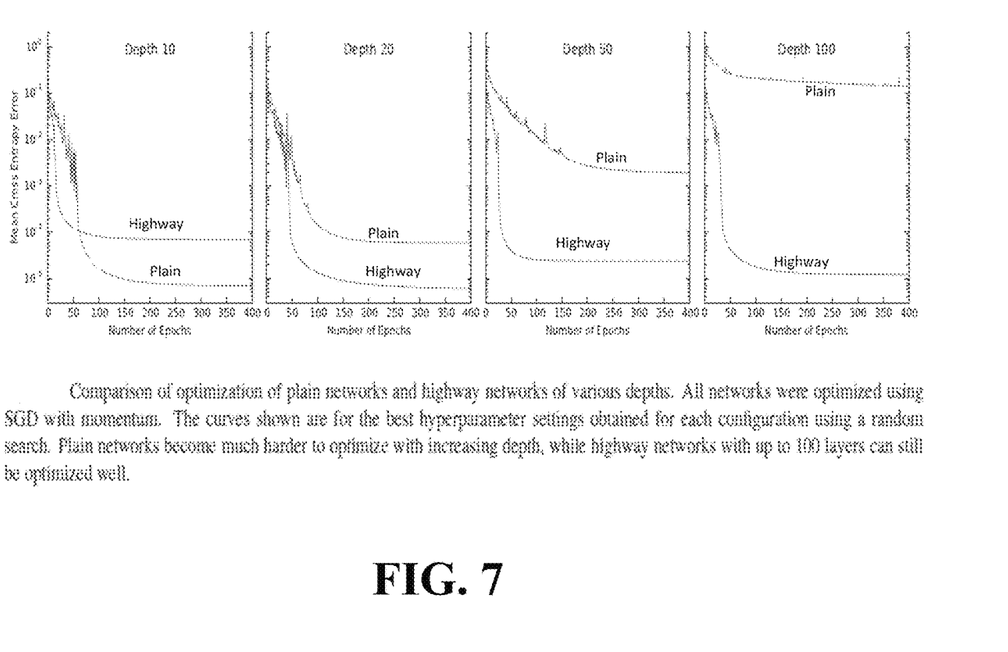
FIG. 7 is a comparison of optimization of plain networks and highway networks of various depths.

The convergence plots for the best performing networks for each depth can be seen in FIG. 7. While for 10 layers, plain networks show very good performance, their performance significantly degrades as depth increases. In contrast, Highway networks do not seem to suffer from an increase in depth at all. The final result of the 100-layer highway network is about 1 order of magnitude better than the 10-layer one, and is on par with the 10 layer plain network. In fact, we also trained similar highway networks with over 1000 layers which showed no sign of difficulty in successful optimization. It is also worth pointing out that the highway networks always converged significantly faster than the plain ones.

What follows is a detailed numerical example illustrating some of the concepts discussed herein.

In some implementations, the output, y, of highway network layer is computed by:

$$y = H(x, W_H) \cdot T(x, W_T) + x \cdot C(x, W_C),$$

where x is the input vector to the layer.

Let's assume that a layer in a Highway Net has two inputs and two neurons (as in FIG. 1, for example). The functions $H(\cdot)$, $T(\cdot)$, and $C(\cdot)$ then each have a 2×2 matrix of weights, $W_H$, $W_T$, $W_C$, respectively:

$$W_H = \begin{bmatrix} h_{11} & h_{12} \\ h_{21} & h_{22} \end{bmatrix}, W_T = \begin{bmatrix} t_{11} & t_{12} \\ t_{21} & t_{22} \end{bmatrix}, W_C = \begin{bmatrix} c_{11} & c_{12} \\ c_{21} & c_{22} \end{bmatrix}.$$

See, e.g., FIG. 1, which shows the weights. The output of each function is computed by $S(x, W_S) = \sigma(W_S x)$ where $S = \{H, T, C\}$, and $\sigma(\cdot)$ is a non-linear function that is applied element-wise, i.e.

$$\sigma(x) = \begin{bmatrix} \sigma(x_1) \\ \sigma(x_2) \end{bmatrix},$$

where $x_i$ is the i-th element of vector x.

Let the input vector $$x \in \mathbb{R}^2 = \begin{bmatrix} 1.0 \\ -1.0 \end{bmatrix},$$

and let the matrices have the following values, for this example:

$$W_H = \begin{bmatrix} 1.0 & 0.0 \\ 0.0 & 1.0 \end{bmatrix}, W_T = \begin{bmatrix} 0.7 & -0.5 \\ 0.5 & 2.1 \end{bmatrix}, W_C = \begin{bmatrix} 0.3 & -0.6 \\ -0.1 & 0.2 \end{bmatrix}.$$

Multiplying each matrix with the input vector we get:

$$W_H x = \begin{bmatrix} 1.0 & 0.0 \\ 0.0 & 1.0 \end{bmatrix} \begin{bmatrix} 1.0 \\ -1.0 \end{bmatrix} = \begin{bmatrix} 1.0 \\ -1.0 \end{bmatrix},$$

$$W_T x = \begin{bmatrix} 0.7 & -0.5 \\ 0.5 & 2.1 \end{bmatrix} \begin{bmatrix} 1.0 \\ -1.0 \end{bmatrix} = \begin{bmatrix} 1.2 \\ -1.6 \end{bmatrix},$$

$$W_C x = \begin{bmatrix} 0.3 & -0.6 \\ -0.1 & 0.2 \end{bmatrix} \begin{bmatrix} 1.0 \\ -1.0 \end{bmatrix} = \begin{bmatrix} 0.9 \\ -0.3 \end{bmatrix},$$

and applying the non-linearity, $\sigma(\cdot)$, $$\sigma(W_H x) = \begin{bmatrix} \sigma(1.0) \\ \sigma(-1.0) \end{bmatrix} = \begin{bmatrix} 0.731 \\ 0.268 \end{bmatrix},$$

-continued $$\sigma(W_T x) = \begin{bmatrix} \sigma(1.2) \\ \sigma(-1.6) \end{bmatrix} = \begin{bmatrix} 0.768 \\ 0.167 \end{bmatrix},$$

$$\sigma(W_C x) = \begin{bmatrix} \sigma(0.9) \\ \sigma(-0.3) \end{bmatrix} = \begin{bmatrix} 0.710 \\ 0.425 \end{bmatrix},$$

assuming that we are using the standard sigmoid function $\sigma(x) = 1/(1 + e^{-x})$.

Finally, $$y = \begin{bmatrix} 0.731 \\ 0.268 \end{bmatrix} \cdot \begin{bmatrix} 0.768 \\ 0.167 \end{bmatrix} + \begin{bmatrix} 1.0 \\ -1.0 \end{bmatrix} \cdot \begin{bmatrix} 0.710 \\ 0.425 \end{bmatrix} = \begin{bmatrix} 1.271 \\ -0.380 \end{bmatrix},$$

where $\cdot$ denotes element-wise multiplication, i.e., $$\begin{bmatrix} a \\ b \end{bmatrix} \cdot \begin{bmatrix} c \\ d \end{bmatrix} = \begin{bmatrix} ac \\ bd \end{bmatrix}.$$

Another way to look at this is that each highway neuron receives the input through three different sets of connections, one for each of its nonlinear transforms. For neuron i these weights correspond to row i in each of $W_H$, $W_T$, $W_C$. For neuron i:

$$y_i = H_i(x) \cdot T_i(x) + x_i \cdot C_i(x)$$
$$= \underbrace{\sigma(h_{i1} x_1 + h_{i2} x_2)}_{H_i(x)} \cdot \underbrace{\sigma(t_{i1} x_1 + t_{i2} x_2)}_{T_i(x)} + x_i \cdot \underbrace{\sigma(c_{i1} x_1 + c_{i2} x_2)}_{C_i(x)},$$

yielding the outputs as before: $y_1 = 1.271$, $y_2 = -0.380$.

A number of embodiments of the invention have been described. Nevertheless, it will be understood that various modifications may be made without departing from the spirit and scope of the invention.

For example, some of the exemplary networks disclosed herein include only highway neurons (e.g., neurons like the ones shown in the figures). However, in some implementations, a computer-based neural network may include a mix of some highway neurons and some other types of neurons (e.g., traditional neurons, etc.).

The non-linear transforms can be virtually any kind of non-linear transforms. One exemplary type of non-linear transform utilizes the sigmoid function. Others are possible as well. In some networks, different neurons may utilize different types of non-linear transforms. In some networks, all of the neurons will utilize the same type of non-linear transform.

A network may include virtually any number of layers (e.g., two or more) and each layer may include any number of neurons. Different layers may include different numbers of neurons. The various neurons in the different layers may be interconnected in various different ways.

The systems and techniques disclosed herein can be applied in virtually any kind of neural network application. Exemplary applications include image and video analysis (classification, detection, tracking of objects), speech recognition, language modeling and understanding, and aiding in training of probabilistic neural networks.

It should be understood that relative terminology used herein is solely for the purposes of clarity and, unless otherwise indicated, is not intended to limit the scope of what is described here to require particular positions and/or orientations and/or orders. Accordingly, such relative terminology should not be construed to limit the scope of the present application.

That said, in a typical implementation, the order of operations H,T,C within a neuron is not particularly important, but, in a typical implementation, of course, operations H,T,C come before the multiplications and additions. Moreover, the ordering from layer to layer is important as well. Information flows in a specified order from one layer to the next in one direction, calculating the gradient(s), for example, depends on this.

To further clarify, within a neuron the non-linear functions may be computed in any order, but the order of non-linearities→products→summation is generally fixed. Moreover, within a layer it doesn't matter in which order the neurons are computed. In a typical implementation, computation of various layers in a network may also be done in a restricted order.

Moreover, some numerical terms, such as "first," "second," "third," etc. are used herein. In general, unless otherwise indicated, these numerical terms are used to simply designate different elements or parts of elements and should not be construed as requiring a certain order. Thus, for example, the phrases "first component" of the input signal and "second component" of the input signal simply refer to different components of the input signal.

In various embodiments, the subject matter disclosed herein can be implemented in digital electronic circuitry, or in computer-based software, firmware, or hardware, including the structures disclosed in this specification and/or their structural equivalents, and/or in combinations thereof. In some embodiments, the subject matter disclosed herein can be implemented in one or more computer programs, that is, one or more modules of computer program instructions, encoded on computer storage medium for execution by, or to control the operation of, one or more data processing apparatuses (e.g., processors). Alternatively, or additionally, the program instructions can be encoded on an artificially generated propagated signal, for example, a machine-generated electrical, optical, or electromagnetic signal that is generated to encode information for transmission to suitable receiver apparatus for execution by a data processing apparatus. A computer storage medium can be, or can be included within, a computer-readable storage device, a computer-readable storage substrate, a random or serial access memory array or device, or a combination thereof. While a computer storage medium should not be considered to include a propagated signal, a computer storage medium may be a source or destination of computer program instructions encoded in an artificially generated propagated signal. The computer storage medium can also be, or be included in, one or more separate physical components or media, for example, multiple CDs, computer disks, and/or other storage devices.

The operations described in this specification can be implemented as operations performed by a data processing apparatus (e.g., a processor) on data stored on one or more computer-readable storage devices or received from other sources. The term "processor" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings and described herein as occurring in a particular order, this should not be understood as requiring that all such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Furthermore, some of the concepts disclosed herein can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The phrase computer-readable medium or computer-readable storage medium is intended to include all mediums that are statutory (e.g., in the United States, under 35 U.S.C. § 101), and, in some instances, to specifically exclude all mediums that are non-statutory in nature to the extent that the exclusion is necessary for a claim that includes the computer-readable (storage) medium to be valid. Some or all of the computer-readable storage media can be non-transitory.

Other implementations are within the scope of the claims.

What is claimed is:

1. A computer-based method of facilitating training in a computer-based neural network, the method comprising:
   receiving an electrical input signal at a neuron in the computer-based neural network that comprises a plurality of neuron layers;
   applying a first non-linear transform to the input signal at the neuron to produce a plain signal;
   applying a second non-linear transform to the input signal at a first gate in the neuron to produce a transform signal;
   applying a third non-linear transform to the input signal at a second gate in the neuron to produce a carry signal; and
   calculating a weighted sum of a non-transformed first component of the input signal and the plain signal at the neuron, wherein calculating the weighted sum of the non-transformed first component of the input signal and the plain signal comprises:
      calculating, with at least one computer-based multiplier, a product of the plain signal and the transform signal to produce a weighted plain signal;
      calculating, with the at least one computer-based multiplier, a product of the non-transformed first component of the input signal and the carry signal to produce a weighted input signal component; and
      adding the weighted plain signal to the weighted input signal component to produce the weighted sum.

2. The method of claim 1, wherein the first, second and third non-linear transforms are functions of the non-transformed first component of the input signal and at least a second component of the input signal.

3. The method of claim 1, wherein the transform signal and the carry signal determine how the plain signal and the non-transformed first component of the input signal are respectively weighted in calculating the weighted sum of the non-transformed first component of the input signal and the plain signal at the neuron.

4. The method of claim 1, wherein the transform signal and the carry signal each have a value from zero to one, but the carry signal is not fixed at zero.

5. The method of claim 1, wherein each of the first, second and third non-linear transforms is a function of the input signal and associated weights.

6. The method of claim 1, wherein the neuron is in a first layer of the computer-based neural network, the method further comprising:
   outputting the weighted sum as an output signal to one or more other neurons in a second layer of the computer-based neural network.

7. The method of claim 1, wherein an input to each layer of the computer-based neural network is a vector and the output signal from each of the neurons is a scalar.

8. The method of claim 1, further comprising producing a network output signal at an output of the computer-based neural network.

9. The method of claim 8, wherein the computer-based neural network is configured to learn, and wherein the learning leads to a reduction in error associated with the network output signal, and wherein the learning comprises adjusting one or more parameters associated with one or more of the first, second or third non-linear transforms at the neuron.

10. The method of claim 9, wherein adjusting the one or more parameters associated with the second non-linear transform at the neuron, and adjusting the one or more parameters associated with the third non-linear transform at the neuron changes weighting associated with the plain signal and the input signal, respectively, to calculate the weighted sum.

11. The method of claim 1, wherein an input to the computer-based neural network represents an object at a single point in time.

12. The method of claim 1, wherein the neuron is among a plurality of neurons in a first of the plurality of neuron layers and wherein the neuron is configured to communicate with all of the neurons in at least a second one of the plurality of neuron layers.

13. The method of claim 1, wherein the computer-based neural network is a deep neural network having 20 layers of neurons or more.

14. The method of claim 1, wherein the weighted sum is a non-binary value.

15. A computer-based neural network comprising:
   a plurality of layers of neurons, wherein each layer of neurons comprises a plurality of neurons, and wherein each of one or more of the neurons:
      comprises an input to receive an electrical input signal;
      applies a first non-linear transform to the input signal to produce a plain signal;
      applies, with a first gate of the neuron, a second non-linear transform to the input signal to produce a transform signal; and
      applies, with a second gate of the neuron, a third non-linear transform to the input signal to produce a carry signal,
      calculates a weighted sum of a non-transformed first component of the input signal and the plain signal; and
      comprises an output to send the calculated weighted sum out of the neuron, and
   wherein the computer-based neural network and each of the neurons is implemented via a processor executing instructions stored on a computer-readable medium,
   wherein calculating the weighted sum of the non-transformed first component of the input signal and the plain signal is performed by the processor executing the instructions stored on the computer-readable medium embodying:
      at least one multiplier module configured to:
         calculate a product of the plain signal and the transform signal to produce a weighted plain signal; and
         calculate a product of the non-transformed first component of the input signal and the carry signal to produce a weighted input signal component; and
      an adder module configured to add the weighted plain signal to the weighted input signal component to produce the weighted sum,
   wherein the at least one multiplier module and the adder module are implemented via the processor executing instructions stored on the computer-readable medium.

16. The computer-based neural network of claim 15, wherein each of the transform signal and the carry signal has a value from zero to one.

17. The computer-based neural network of claim 16, wherein applying the first non-linear transform to the input signal is performed by the processor executing the instructions stored on the computer-readable medium to apply the first non-linear transform.

18. The computer-based neural network of claim 16, further comprising:
the computer-readable medium, wherein the computer-readable medium stores parameters associated with each of the first, second and third non-linear transforms associated with all of the neurons in the neural network,
wherein each of the first, second and third non-linear transforms is a function of the input signal and the associated parameters.

19. The computer-based neural network of claim 16, wherein each neuron in each of the neuron layers is configured to communicate with all of the neurons in at least one other of the neuron layers.

20. The computer-based neural network of claim 19, wherein a neuron in a first layer of the computer-based neural network is configured to output the weighted sum as an output signal on the output of the neuron to a plurality of other neurons in a second layer of the computer-based neural network.

21. The computer-based neural network of claim 16, wherein an input to each layer in the plurality of layers of neurons is a vector, the weighted sum out of each of the neurons is a scalar and an output of the computer-based neural network is a vector.

22. The computer-based neural network of claim 16, further configured to produce a network output signal at an output of the computer-based neural network,
wherein the computer-based neural network is configured to learn, such that the learning leads to a reduction in error associated with the network output signal, and
wherein the learning comprises adjusting one or more parameters associated with the first non-linear transform, and/or the second non-linear transform, and/or the third non-linear transform, at each of one or more of the neurons.

23. The computer-based neural network of claim 22, wherein adjusting the one or more parameters associated with the second non-linear transform at the one or more of the neurons, and adjusting the one or more parameters associated with the third non-linear transform at the one or more of the neurons changes weighting associated with the plain signal and the non-transformed first component of the input signal, respectively, to calculate the weighted sum.

24. The computer-based neural network of claim 16, wherein an input to the computer-based neural network represents an object at a single point in time.

25. The computer-based neural network of claim 16, wherein the computer-based neural network is a deep neural network having 20 layers of neurons or more.

26. A non-transitory, computer-readable medium that stores instructions executable by a processor to perform the steps to facilitate training of a computer-based neural network, the steps comprising:
receiving an electrical input signal at a neuron in the computer-based neural network that comprises a plurality of neuron layers;
applying a first non-linear transform to the input signal in the neuron to produce a plain signal;
applying a second non-linear transform to the input signal at a first gate in the neuron to produce a transform signal;
applying a third non-linear transform to the input signal at a second gate in the neuron to produce a carry signal; and
calculating a weighted sum of a non-transformed first component of the input signal and the plain signal at the neuron, wherein calculating the weighted sum of the non-transformed first component of the input signal and the plain signal at the neuron comprises:
calculating, with at least one computer-based multiplier, a product of the plain signal and the transform signal to produce a weighted plain signal;
calculating, with the at least one computer-based multiplier, a product of the non-transformed first component of the input signal and the carry signal to produce a weighted input signal component; and
adding, with a computer-based adder, the weighted plain signal to the weighted input signal component, to produce the weighted sum.

27. The non-transitory, computer-readable medium of claim 26, wherein the transform signal and the carry signal determine how the plain signal and the input signal are respectively weighted in calculating the weighted sum of the first one of the input signals and the plain signal at the neuron, and wherein the transform signal has a value from zero to one, and wherein the carry signal has a value from zero to one.

28. A method comprising:
providing a computer-based neural network comprising a plurality of layers of neurons, wherein each layer of neurons comprises a plurality of neurons, and wherein each respective one of one or more of the neurons comprises:
an input to receive an electrical input signal; and
an output to send an electrical output signal to every one of the neurons in a subsequent one of the neuron layers;
wherein the computer-based neural network and each of the neurons in the computer-based neural network is implemented via a processor executing instructions stored on a computer-readable medium,
receiving an electrical input signal at a first neuron in a first layer of the computer-based neural network;
applying a first non-linear transform to the input signal at the first neuron to produce a plain signal;
applying a second non-linear transform to the input signal at a first gate in the first neuron to produce a transform signal;
applying a third non-linear transform to the input signal at a second gate in the first neuron to produce a carry signal; and
calculating a weighted sum of a non-transformed first component of the input signal and the plain signal at the first neuron, wherein calculating the weighted sum of the non-transformed first component of the input signal and the plain signal comprises:
calculating, with at least one computer-based multiplier, a product of the plain signal and the transform signal to produce a weighted plain signal;
calculating, with the at least one computer-based multiplier, a product of the non-transformed first component of the input signal and the carry signal to produce a weighted input signal component; and
adding, with a computer-based adder, the weighted plain signal to the weighted input signal component to produce the weighted sum,
wherein calculating the weighted sum of the non-transformed first component of the input signal and the plain signal is performed by the processor executing the instructions stored on the computer-readable medium embodying the computer-based multiplier and the computer-based adder, and sending an electrical signal representing the weighted sum of the non-transformed first component of the input signal and the plain signal out from the output of the first neuron of the computer-based neural network to each respective one of a plurality of neurons in a second layer of neurons of the computer-based neural network; and adjusting one or more parameters associated with the first non-linear transform, and/or the second non-linear transform, and/or the third non-linear transform, at each of one or more of the neurons.

\* \* \* \* \*